Aug. 15, 1961  H. D. SCHNITZIUS ET AL  2,995,775
INJECTION MOLDING
Filed Dec. 26, 1957  2 Sheets-Sheet 1

Inventors
Homer D. Schnitzius
John M. Cox
By John L. Hutchinson
attorney

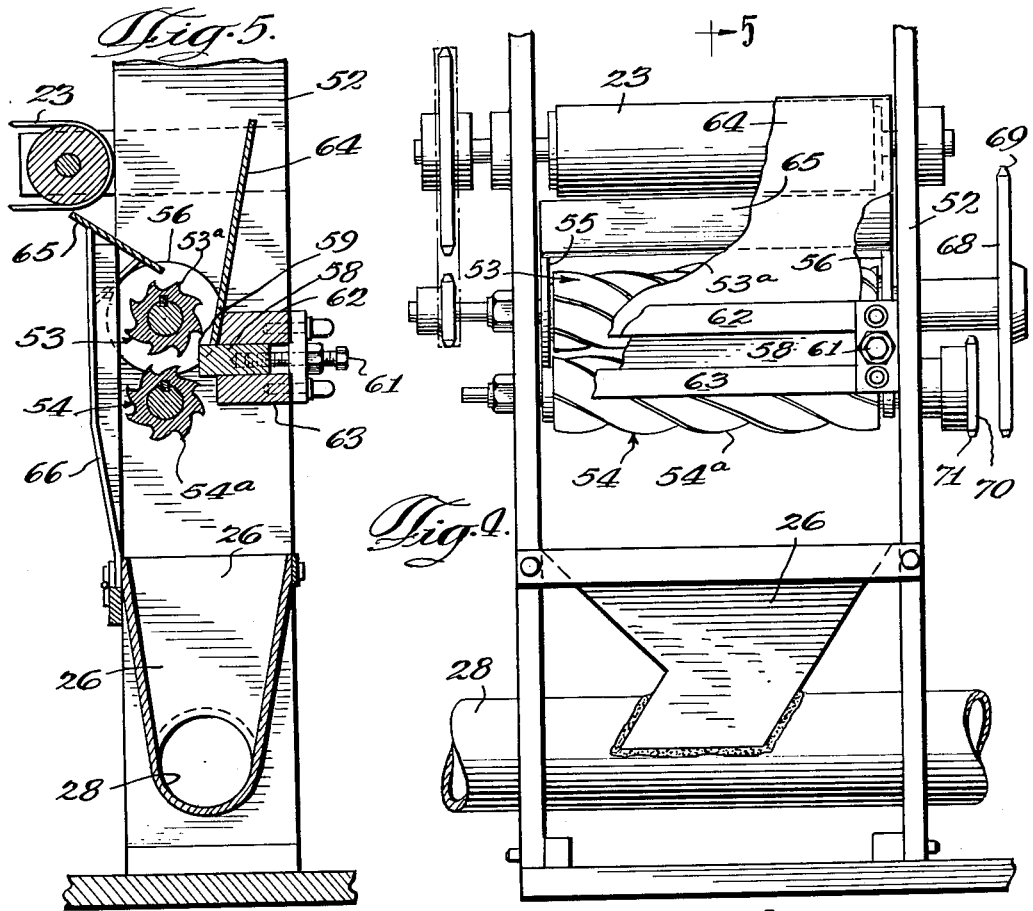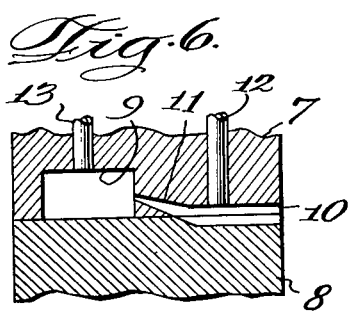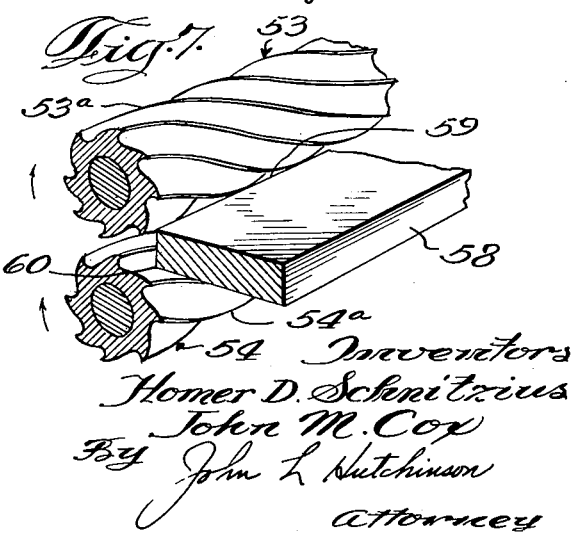

though the sprue and molded part are automatically separated upon ejection from the mold, both parts normally are permitted to fall into a common collector. Special mechanisms have been developed to segregate the sprue and molded part although such mechanisms are not widely in use at the present time. However, in most cases it is customary to return the sprue to the reservoir of the injection machine by hand or to collect the sprues for independent grinding and subsequent reuse. This results in added expense in a molding operation and also has a tendency to reduce uniformity of molded products in that more than one sprue consisting of previously molded material per given amount of new plastic material being injected into the mold may be present rather than a predetermined amount of sprue material for each portion of new material charged into the mold. Further, molding material is usually supplied in pelletized form for ease in handling injection molding equipment. Sprues resulting from molding operations are normally of a size which is relatively large as compared to the size of the pellets of the raw material. This difference in size between the sprue and new material which is pelletized will create flow problems in withdrawing material from the reservoir to be molded.

Accordingly, it is an object of this invention to improve present practices used in injection molding whereby more fully automatic processes can be employed, costs reduced and production increased.

Another object is the provision of injection molding equipment which will automatically and continuously inject plastic material into a mold, segregate the molded part and its associated sprue, comminute the sprue and return the comminuted sprue to a predetermined point in the reservoir containing material waiting to be processed.

Another object is to provide an improved mechanism for segregating sprue and molded part formed in an injection molding process.

A further object is to provide a means for comminuting hot sprue material whereby it can be reintroduced into the reservoir or hopper of an injection molding machine as particles of approximately the same size as those particles of new material which are being used.

A still further object is to provide a method which will enable the introduction of reground previously processed material into new material awaiting processing in such a manner that the ratio of reground material to new material will remain substantially constant.

The foregoing and other objects are accomplished in part by means of a mechanical separating arrangement which segregates the previously separated sprue and molded part automatically following discharge from the mold. Following segregation, the sprue is immediately transferred to a cutter machine which is designed so as to comminute the sprue while still in a heated and somewhat plastic state. The sprue particles are then introduced into a pneumatic conveyor which immediately transfers the particles to a predetermined point in the reservoir containing new plastic material awaiting introduction into the injection cylinder.

The operations of segregating the sprue and molded part and comminuting the sprue is performed in timed sequence with the injection molding operation whereby a predetermined amount of comminuted sprue material may be introduced into the reservoir of the injection molding machine such that each new charge of plastic material into the mold contains approximately the same ratio of new material to comminuted sprue material. This provides for more uniformity of properties in the molded article.

One of the important aspects of the apparatus is the provision of the cutter for comminuting hot plastic sprue. Numerous devices have been developed for grinding or otherwise reducing in size plastic material. However, all such devices are adapted to operate on plastic material at room temperatures for the reason that, when plastic material is at elevated temperatures, its plasticity increases to the point where it is gummy and, therefore, normally very difficult to comminute. By means of the cutter machine of this invention, plastic material in a heated state is readily reduced in size irrespective of its gummy nature and the resultant particles easily handled by a pneumatic conveyor.

In the drawings,

FIGURE 4 is a front elevation, partly broken away, of the cutter machine.

FIGURE 5 is the vertical section taken along the line 5—5 of FIGURE 4.

FIGURE 6 is a fragmentary view, in cross section, of a die of the type used to form molded articles.

FIGURE 7 is a partial perspective view showing, in more detail, the cutting mechanism.

Figure 1:
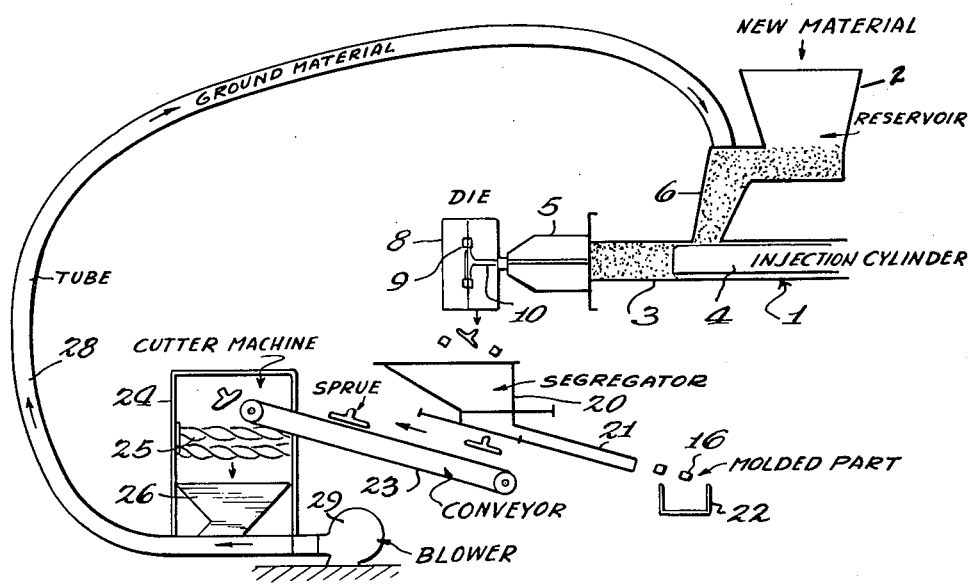
FIGURE 1 is a schematic view of the equipment used in the present invention.

Turning now to the drawings and in particular to FIGURE 1, the numeral 1 indicates generally an injection molding machine of the standard type commonly employed in the industry. Such a machine includes a reservoir or hopper 2 into which is introduced plastic material, usually in pelletized form, which is to be molded into a desired article. Also provided is an injection cylinder 3 having a ram or plunger 4 for forcing plastic material through a nozzle 5 into a die or mold. Although not shown, heating means are normally associated with the cylinder 3 to soften the plastic material and reduce it to a semi-fluid state whereby it can be more easily forced through nozzle 5 and into the runners and cavity of the die. Between the reservoir or hopper 2 and the cylinder 3 there is shown a somewhat restricted passageway 6 through which plastic material is drawn from the reservoir to the cylinder when the ram is retracted. Normally, passageway 6 is of such dimensions that it will contain, at any time, approximately that quantity of plastic material which will be transferred from the cylinder to the die for each stroke of plunger 4. Passageway 6 is sometimes referred to as a "proportioner" or "throat."

The die is composed of two mold sections 7 and 8, one or both having appropriate recesses which form the mold cavity 9 when the mold sections are closed. One of the mold sections, such as mold section 7, normally contains a small passageway 10 through which plastic material is forced from the injection nozzle into the mold cavity. If a die is used having a plurality of mold cavities, there is usually a central distributing point for plastic material in one of the mold sections from which extend a plurality of runners opening into each of the individual mold cavities. The central opening is technically referred to as the "sprue" passageway. As will be appreciated by those familiar with the molding art, a molding operation will normally result not only in the formation of the molded part but also, as previously indicated, in the formation of integral hardened extensions which result from solidification of plastic present in the sprue and runner passageways. For purposes of describing the present invention, the hardened plastic material which is formed in both the sprue and runner passageways of the die will be referred to as the "sprue," this being the commonly accepted terminology.

After the die is opened by separating molded sections 7 and 8, the sprue 15 and the molded part 16 are automatically separated by a principle which is sometimes referred to as "submarine gating" or "sub gating." This separation is accomplished by means of special mold construction which is more clearly indicated in FIGURE 6. In this latter figure there is shown the two mold sections 7 and 8 in closed position, resulting in the formation of the die cavity 9. The passageway 10 through which plastic material is forced into the mold cavity is, as indicated in FIGURE 6, formed as the result of two oppositely disposed recesses in mold sections 7 and 8. It will be noted that the passageway 10 as it approaches cavity 9 becomes quite restricted. It will also be noted that this restricted portion 11 of the passageway 10 is formed wholly within one of the mold sections, namely mold section 7. Upon opening of the die by separation of mold sections 7 and 8, ejector pins 12 and 13 will be operated and forced against the sprue and the molded part formed in passageway 10 and cavity 9, respectively, thus ejecting the sprue and molded part. As a result of a small portion of the sprue being formed in the restricted passageway 11, operation of ejector pins 12 and 13 will automatically break away the sprue from the molded part causing their ejection from the die as separate items. The separated sprue 15 and molded part 16 are then permitted to fall into a segregator 20, the construction of which is illustrated in further detail in FIGURE 2.

In the segregator the molded part and the sprue are mechanically separated, the molded part being discharged through chute 21 into a container 22 and the sprue being transferred to a conveyor 23. This conveyor carries the sprue to a cutter machine 24 wherein the sprue is comminuted by a series of coacting knives and rollers provided with helical teeth, such mechanism being indicated generally in FIGURE 1 by the numeral 25 and described more in detail hereinafter.

Immediately beneath the rollers and coacting knives there is shown a collecting hopper 26 adapted to receiving the particles of comminuted sprue. The lower end of the hopper extends into a tube 28 forming a pneumatic conveyor. As is shown in FIGURE 1, one end of tube 28 is connected to the pressure side of a blower 29 while the other end is connected to the intermediate passageway or proportioner 6 between the reservoir 2 of the injection molding machine and the cylinder 3. By means of the blower and tube 28 particles of plastic material resulting from the comminution of the sprue will be pneumatically conveyed to the reservoir of new material waiting to be processed in the injection machine.

Any suitable programming arrangement, not shown, may be used to control the timing of the various operations including the injection of plastic material into the die, opening of the die and discharge of the molded part and sprue, operation of the gates of the segregator, comminution of the sprue and return of the sprue particles to the reservoir.

The segregator 20 consists of an upwardly flared hopper section 31 and a downwardly extending throat section 32. Connected to the lower portion of throat section 32 is an inclined discharge chute 21 through which molded parts 16, after segregation from the sprue 15, are permittted to fall into a container 22. The mechanism for segregating the sprue from the molded part comprises two vertically spaced gates 33 and 34. Each of the gates is adapted to be retracted from extending across the throat section 32 of the segregator by any appropriately timed mechanism such as, for example, hydraulic means 35 and 36, respectively. Gate 34 is formed as a continuous body and, as indicated, is inclined at an angle in alignment with the bottom of discharge chute 21. Thus, articles falling downwardly through the segregator 20 upon striking the gate 34 in its closed position, will be directed into discharge chute 21.

Figure 2:
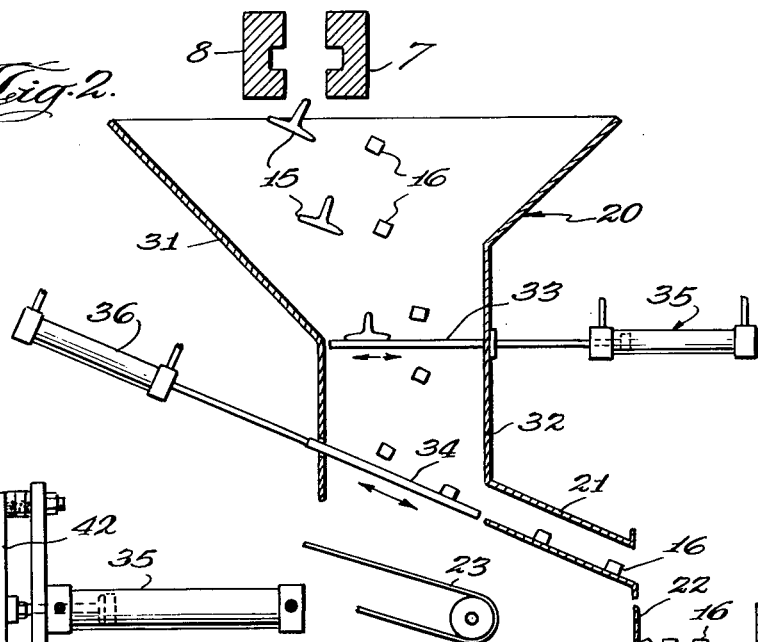
FIGURE 2 is an elevation, partly in section, of the segregator.
Figure 3:
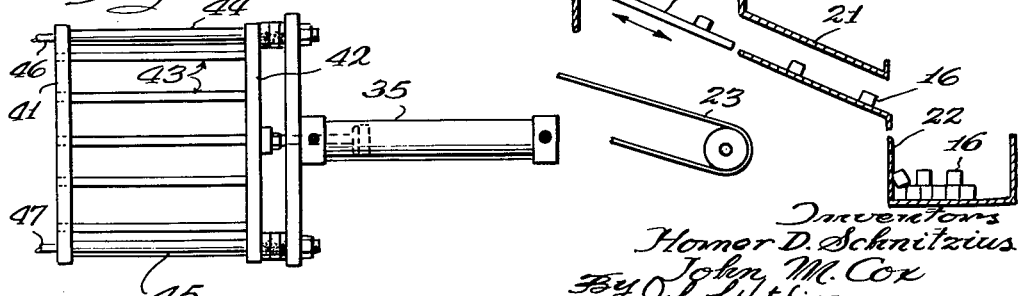
FIGURE 3 is a plan of one of the gates which are used in the segregator.

Gate 33 is of an open or lattice work construction enabling the smaller of the molded part or sprue to pass through it when in closed position. As shown in FIGURE 2, the sprue is indicated as the larger of the two parts and, accordingly, it is retained by gate 33 in its closed position while the smaller of the parts, namely, the molded part, is permitted to pass through unobstructed. In FIGURE 3 a preferred construction of gate 33 is indicated. Thus, as shown in this figure, the gate includes two end brackets 41 and 42. Extending between the end brackets are a plurality of parallel spaced rods or tines 43. The spacing between the tines should be such that the smaller of the molded part or sprue can readily pass between them while the larger of these articles will be retained on the upper surface of the gate. To assist in guiding the gate in its operation, hollow tubes 44 and 45 are provided at each end which are adapted to ride on guide rods 46 and 47. The gate is opened or closed by the aforementioned hydraulic mechanism 35. While a gate having a plurality of parallel rods or tines has been disclosed as being the preferred structure, it will be appreciated that any similar open network arrangement which will permit the passage of a small sized article while retaining a larger sized article would be appropriate.

FIGURES 4, 5 and 7 disclose more in detail the cutting machine which forms a part of the apparatus and which actually, in one sense, may be considered as the key which enables the use of the other associated apparatus in a manner to obtain substantially automatic molding. The cutter machine consists of two vertically extending frame members 51 and 52 having journaled there between parallel differentially rotatable rotors 53 and 54, each of which is provided with helical teeth 53a and 54a, respectively. The uppermost rotor is additionally provided with two end guards 55 and 56 for the purpose of preventing plastic material being comminuted by the rotor teeth and associated knife edges, referred to below, from moving longitudinally off the ends of the rotor and into the mechanism for rotating the rotors or its bearings. Extending parallel to the line of intersection of the two rotors 53 and 54 is a dual edged knife 58, the two edges being indicated by the numerals 59 and 60. Edge 59 of knife 58 is positioned so as to cooperate with the helical teeth 53a of rotor 53 in comminuting a plastic mass. Correspondingly, edge 60 of knife 58 is adapted to coact with helical teeth 54a on rotor 54. The position of knife 58 with respect to rotors 53 and 54 may be adjusted by means of a threaded screw 61, the knife being slidably supported in brackets 62 and 63.

A hopper is provided for receiving the plastic sprue discharged from conveyor 23 and directing it into the comminuting mechanism. This hopper is formed by means of vertically inclined panel 64 which may be secured to the frame members 51 and 52 and the panel 65 which is attached to a cover panel 66. The cover panel 66 can be secured to the housing of the comminuting machine in such a manner that it may be removed to permit access to the comminuting mechanism. While there has been shown only two cutting rotors and an associated dual edge knife, it should be understood that additional cutting rotors and knives may be likewise provided, if necessary, to further comminute or reduce the size of the hot sprue.

In operation, plastic molding material from the proportioner 6 is drawn into the injection cylinder 3 wherein it is heated to a suitable plastic state sufficient to permit flow under pressure into the die. After attaining the desired plasticity, the plastic material is subjected to pressure by the ram or plunger 4 and is forced through nozzle 5 into mold cavity 9 of the die. Shortly after injection into the relatively cold mold cavity, the plastic material will have hardened sufficiently so as to retain the shape of the cavity and, accordingly, mold sections 7 and 8 are moved automatically after a proper time lapse in opposite directions, the molded part and sprue being simultaneously separated and ejected.

The sprue 15 and the molded parts 16, assuming a plural cavity die, are permitted to fall into the hopper section 31 of the segregator 20. At this point gate 33 is in its closed position whereby it extends across the downward part of the sprue and molded part. Likewise at this time gate 34 is in its closed position. As a result of the construction of gate 33, the sprue, because of its size, will not pass through the openings between the tines of the gate while the smaller molded part will pass through and does so, falling downward until it strikes the upper surface of gate 34. By reason of the inclination of gate 34 and its alignment with discharge chute 21, the molded part 16 is directed, first, into the inclined discharge chute and then into the container 22.

As soon as all of the molded parts have been collected in the container 22 in the foregoing manner, gates 33 and 34 are simultaneously retracted or opened, permitting the sprue which had theretofore been retained by gate 33 to fall downwardly until it is caught by the conveyor 23. Conveyor 23 carries the sprue upwardly and eventually discharges it into the hopper formed by panels 64 and 65 of the cutter machine.

It should be emphasized at this point that, although the sprue has a definite shape due to the fact that the plastic material from which it has been formed has hardened to a certain degree, it is still at an elevated temperature and hence is quite plastic. Any attempt to grind or otherwise comminute plastic material in such a heated state would result in a gumming up of the normal type of apparatus that is currently available for comminuting plastic material for the reason that such apparatus has been designed to work only on material which is at substantially room temperature and has no appreciable plasticity.

Both rotors of the cutter machine of the present invention are adapted to be rotated clockwise past their associated edges of knife 58. Successive portions of the sprue, which is at an elevated temperature and a relatively high degree of plasticity, are forced by the helical teeth 53a of rotor 53 past edge 59 of knife 58, whereby said portions are pulled away from the main body of the sprue forming smaller segments. The helical teeth 54a of the lower rotor 54 pick up these segments of the sprue carried past the knife edge 59 by the helical teeth 53a and, in turn, force them past the lower edge 60 of the knife 58 thereby further subdividing the segments. The lower rotor 54 is preferably rotated at a higher rate of speed with respect to the rotor 53, one particular ratio found satisfactory for polystyrene and similar plastics being about 4 to 1. The action of the helical teeth in cooperation with the knife edges is one of shearing rather than the normal cutting, which has been determined to be desirable when subdividing heated plastic material such as contemplated herein. It will be appreciated that various types of plastic material may be injection molded and that each material will have different properties, such as plasticity, elongation, etc. To accommodate materials having such varying properties it may be necessary to adjust the position of knife 58 with respect to rollers 53. Also, the adjustment of the knife 58 may be used to vary the size of particles produced.

After comminution of a plastic sprue, the particles are permitted to fall into hopper 26 and then into the tube 28. By means of the blower and an appropriate air velocity for the particular size particles involved, the particles are immediately conveyed through the tube 28 back to the throat of the injection cylinder wherein they are mixed with new material awaiting introduction into the mold.

In addition to serving as a means for transferring ground material to the reservoir, the pneumatic conveyor also serves to cool the ground particles thereby reducing the tendency of such particles to adhere to one another which would be the case if they were maintained at an elevated temperature.

In the production of molded parts, it is necessary that uniform procedures be established to insure uniform and reproducible properties. Accordingly, it is desirable that the proper ratio of comminuted sprue material to new material be automatically established such that there will be no appreciable variance in properties of a molded article formed from a mixture of the two. This desired ratio of previously molded material and new material is assured by appropriate timing of the various operations to be performed whereby comminuted sprue is introduced into the new material awaiting processing in predetermined ratios.

The various operations of the apparatus are preferably established in such a sequence that one comminuted sprue is introduced into the proportioner 6 for each injection shot. It is preferable to introduce the comminuted sprue into the throat 6 of the reservoir rather than into the main part of the reservoir 2 to insure better control over the proportion of previously molded material to new material. If the comminuted sprue were introduced into the main body of new material present in the reservoir 2 there would be less likelihood that there would be uniformity of properties due to the fact that there would be more of a chance for introducing previously unmolded material into the injection cylinder without the proper mixture of comminuted sprue.

By means of an appropriate programming arrangement, the operation of gates 33 and 34 may be timed so as to insure that the sprue passes completely through the segregator and cutter within the time allowed for the reintroduction of the comminuted sprue into the new material entering the injection cylinder.

The foregoing apparatus results in a substantially fully automatic injection molding operation and the only manual labor involved would be that of introducing material to be molded into reservoir 2. It has been found that a machine of the foregoing type reduces costs and also increase production up to twenty-five percent. Further, it has also been found that with proper programming, sprue material can be immediately reused and the quality of a molded product maintained.

While there have been shown and described certain exemplary embodiments of the invention, it will be understood that the invention is intended to be limited only by the scope of the following claims.

We claim:

1. An injection molding apparatus comprising in combination a mold, a reservoir for plastic material, means for injecting plastic material from said reservoir at an elevated temperature into said mold, means for discharging the resultant sprue and molded part as independent units from said mold, means for segregating said sprue and molded part, means for immediately comminuting said segregated sprue while still in a heated and partially plastic condition, and means for returning the sprue particles to said reservoir; said means for comminuting said sprue comprising a pair of cooperative parallel differentially-rotatable rotors, each provided with helical teeth and an independent cutting edge alligned parallel with each of said rotors, whereby the helical teeth of each of said rotors may co-act with its associated cutting edge as well as with each other to assist in comminuting said sprue.

2. An apparatus as described in claim 1 wherein the first of said differentially rotatable rotors which normally comes in contact with said sprue is provided with guards at each end thereof to prevent plastic sprue material from being discharged off the ends of said roller.

3. An apparatus as described in claim 1 wherein the means for returning the sprue particles to said reservoir comprises a pneumatic conveyor.

4. An injection molding apparatus comprising in combination a mold; a reservoir for plastic material; means for injecting plastic material at an elevated temperature from said reservoir into said mold; means for discharging the resultant sprue and molded part as independent units from said mold; a hopper disposed below said mold to receive both the sprue and molded part, a pair of vertically spaced gates within said hopper, said gates being adapted to segregate the sprue from the molded part and direct said articles to independent collecting stations; means for immediately comminuting said sprue while in a heated and partially plastic state including a pair of cooperative parallel differentially-rotatable rotors provided with helical teeth and a dual edge knife aligned parallel with said rotors whereby the helical teeth on each of said rotors may co-act with opposite edges of said knife as well as with each other to assist in comminuting said sprue; conveyor means for transferring the sprue from said hopper to said comminuting means; and means for returning the comminuted sprue to said reservoir.

5. An apparatus as described in claim 4 wherein said means for returning said comminuted sprue to said reservoir is a pneumatic conveyor.

6. An apparatus for comminuting a hot plastic mass comprising a pair of cooperative differentially-rotatable rotors, each of said rotors being provided with helical teeth, a dual edge knife disposed in parallel relationship with said rotors, the helical teeth on each of said rotors being adapted to co-act with opposite edges of said knife, means for initially feeding the hot plastic mass between the slowest of said rotors and its corresponding knife edge, and guards disposed adjacent to each end of the slowest of said rotors to prevent discharge of the plastic mass off the ends of said rotor.

7. An injection molding apparatus comprising in combination a mold; a reservoir for plastic material; means for injecting plastic material at an elevated temperature from said reservoir into said mold; means for discharging the resultant sprue and molded part as independents units from said mold; a hopper disposed below said mold to receive both the sprue and molded part, a pair of vertically spaced gates within said hopper, said gates being adapted to segregate the sprue from the molded part and direct said articles to independent collecting stations; means for immediately comminuting said segregated sprue while in a heated and partially plastic state; including a pair of cooperative parallel differentially-rotatable rotors provided with helical teeth and an independent cutting edge disposed parallel to each of said rotors, the helical teeth on each of said rotors being adapted for co-action with its associated cutting edge as well as with the helical teeth on the opposing rotor to assist in comminuting said sprue; means for transferring the sprue from said hopper to said comminuting means; and conveyor means for immediately returning the comminuted sprue to said reservoir.

8. An apparatus for comminuting a hot plastic mass comprising a pair of cooperative, differentially-rotatable rotors each of said rotors being provided with helical teeth, an independent cutting edge disposed parallel to each of said rotors and in parallel spaced relation to each other on the same side of said rotors, the helical teeth on each of said rotors being adapted for coaction with its associated cutting edge as well as with the helical teeth on the opposing rotor, and means for initially feeding the hot plastic mass between the slowest of said rotors and its associated cutting edge.

9. An apparatus as described in claim 8 including means for adjusting said cutting edges toward and away from the helical teeth of their associated rotors.

References Cited in the file of this patent

UNITED STATES PATENTS

| | | |
|---|---|---|
| 663,559 | Case | Dec. 11, 1900 |
| 1,619,210 | MacLaren | Mar. 1, 1927 |
| 1,755,277 | Staup | Apr. 22, 1930 |
| 1,796,104 | Hopkins | Mar. 10, 1931 |
| 1,875,562 | Clute | Sept. 6, 1932 |
| 1,924,019 | Berger et al. | Aug. 22, 1933 |
| 2,024,711 | Wendler | Dec. 17, 1935 |
| 2,292,901 | Schmitz | Aug. 11, 1942 |
| 2,330,369 | Marsh | Sept. 28, 1943 |
| 2,382,655 | Nichols | Aug. 14, 1945 |
| 2,415,961 | Nast | Feb. 18, 1947 |
| 2,486,346 | Wachs | Oct. 25, 1949 |
| 2,514,616 | Adams | July 11, 1950 |
| 2,523,137 | Nichols et al. | Sept. 19, 1950 |
| 2,615,567 | Campbell | Oct. 28, 1952 |
| 2,687,801 | Jackson | Aug. 31, 1954 |
| 2,777,166 | Morin | Jan. 15, 1957 |